United States Patent
Bende

(10) Patent No.: US 11,431,052 B2
(45) Date of Patent: *Aug. 30, 2022

(54) STARTER MODULE ADAPTER

(71) Applicant: Miklos Bende, Oak Brook, IL (US)

(72) Inventor: Miklos Bende, Oak Brook, IL (US)

( * ) Notice: Subject to any disclaimer, the term of this patent is extended or adjusted under 35 U.S.C. 154(b) by 306 days.

This patent is subject to a terminal disclaimer.

(21) Appl. No.: 16/440,375

(22) Filed: Jun. 13, 2019

(65) Prior Publication Data

US 2020/0014003 A1 Jan. 9, 2020

Related U.S. Application Data

(63) Continuation-in-part of application No. 16/219,585, filed on Dec. 13, 2018, now Pat. No. 11,024,915, and a continuation-in-part of application No. 16/042,625, filed on Jul. 23, 2018, now Pat. No. 10,784,488, and a continuation-in-part of application No. 16/027,832, filed on Jul. 5, 2018, now Pat. No. 10,811,648.

(51) Int. Cl.
| | |
|---|---|
| *H01G 11/78* | (2013.01) |
| *H01G 11/08* | (2013.01) |
| *H01G 2/10* | (2006.01) |
| *H01R 11/01* | (2006.01) |
| *H01M 50/20* | (2021.01) |
| *H01M 50/50* | (2021.01) |

(52) U.S. Cl.
CPC ............. *H01M 50/20* (2021.01); *H01G 2/10* (2013.01); *H01G 11/08* (2013.01); *H01G 11/78* (2013.01); *H01M 50/50* (2021.01); *H01R 11/01* (2013.01); *H01M 2220/20* (2013.01)

(58) Field of Classification Search
CPC ........ H01M 50/20; H01M 50/50; H01G 2/10; H01G 11/08; H01G 11/78; H01R 11/01
See application file for complete search history.

(56) References Cited

U.S. PATENT DOCUMENTS

| | | | |
|---|---|---|---|
| 2,707,721 A | 5/1955 | Anderson et al. |
| 4,255,502 A | 3/1981 | Taylor, III |
| 4,885,524 A | 12/1989 | Wilburn |
| 5,162,164 A | 11/1992 | Dougherty et al. |
| 5,939,960 A | 8/1999 | Godel et al. |
| 7,573,229 B2 | 8/2009 | Arakelian |
| 8,514,039 B1 | 8/2013 | Yamane et al. |

(Continued)

FOREIGN PATENT DOCUMENTS

| | | |
|---|---|---|
| WO | WO 2013/138380 | 9/2013 |
| WO | WO 2016/205386 | 12/2016 |

OTHER PUBLICATIONS https://interplex.com/busbar-guide/. (Year: 2018).*

(Continued)

*Primary Examiner* — Sarah A. Slifka
*Assistant Examiner* — Rachel L Zhang
(74) *Attorney, Agent, or Firm* — Barnes & Thornburg LLP

(57) ABSTRACT

A starter module adapter for a vehicle or other equipment including a starter module and a housing assembly having a pair of terminals. The starter module adapter may include a metal receiver functioning as an electrical connector defining a receptacle for receiving the starter module. The exterior dimensions of the housing assembly may be the same as the exterior dimensions of a standard battery.

40 Claims, 8 Drawing Sheets

(56) References Cited

U.S. PATENT DOCUMENTS

| | | |
|---|---|---|
| 9,525,195 B2 | 12/2016 | Wyatt et al. |
| 10,784,488 B2 * | 9/2020 | Bende ................ H01M 50/502 |
| 10,811,648 B2 * | 10/2020 | Bende .................. H01M 50/20 |
| 11,024,915 B2 * | 6/2021 | Bende .................. H01M 50/20 |
| 2008/0118819 A1 | 5/2008 | Gamboa |
| 2010/0266878 A1 * | 10/2010 | Eilertsen ............... H01M 50/20 |
| | | 429/53 |
| 2011/0189533 A1 | 8/2011 | Reis et al. |
| 2014/0295250 A1 | 10/2014 | Nishikawa et al. |
| 2015/0037616 A1 | 2/2015 | Wyatt et al. |
| 2015/0037640 A1 | 2/2015 | Pinon et al. |
| 2015/0318521 A1 | 11/2015 | Zeiler et al. |
| 2016/0006087 A1 | 1/2016 | Lee |
| 2016/0082946 A1 * | 3/2016 | Kodawara ............... B60L 50/16 |
| | | 701/22 |
| 2016/0087310 A1 * | 3/2016 | Cho ...................... H01M 4/583 |
| | | 429/156 |
| 2016/0093845 A1 | 3/2016 | Dekeuster et al. |
| 2016/0093848 A1 | 3/2016 | Dekeuster et al. |
| 2016/0093852 A1 | 3/2016 | Dekeuster et al. |
| 2016/0093854 A1 | 3/2016 | Tyler et al. |
| 2016/0197332 A1 | 7/2016 | Lee |
| 2016/0243960 A1 * | 8/2016 | Wood .................... H02J 7/1423 |
| 2016/0380252 A1 | 12/2016 | Rhein |
| 2017/0146611 A1 | 5/2017 | Yonan |
| 2018/0053926 A1 | 2/2018 | Shaffer, II et al. |

OTHER PUBLICATIONS

Search Report & Written Opinion issued in Int'l App. No. PCT/US2019/036965.

Extended Search Report issued in Appl. No. EP19830050 (dated May 11, 2022).

* cited by examiner

STARTER MODULE ADAPTER

This application is a Continuation-in-Part of copending U.S. application Ser. No. 16/027,832, filed Jul. 5, 2018, U.S. application Ser. No. 16/042,625, filed Jul. 23, 2018, and U.S. application Ser. No. 16/219,585 filed Dec. 13, 2018, the contents of which are incorporated herein by reference in their entirety.

The present disclosure relates to a starter module adapter for a vehicle or other equipment.

BACKGROUND

Automobiles and other vehicles and equipment typically are designed with a certain standard battery size in mind. During the design, the clearances around and above the battery, the battery tray, the method of securing the battery, the positive and negative lead lengths typically are all predetermined based on such certain standard battery size. As a result, odd size starter modules that do not have such standard battery size typically cannot be used with such equipment.

SUMMARY

The present disclosure relates to a starter module adapter for a starter module. The starter module has a first positive terminal and a first negative terminal and a distance therebetween. The starter module adapter comprises a housing assembly that includes a second positive terminal and a second negative terminal having a distance therebetween. The distance between the second positive terminal and the second negative terminal is greater than the distance between the first positive terminal and the first negative terminal. The housing assembly further includes a first electrical connector interconnecting the first positive terminal and the second positive terminal, and a second electrical connector interconnecting the first negative terminal and the second negative terminal. One of the first electrical connector and the second electrical connector may comprise a metal receiver defining a receptacle for receiving the starter module. The other of the first electrical connector and the second electrical connector may comprise any other suitable electrical connector.

The metal receiver may include a metal extension for adjusting the length of the metal receiver. For example, the metal receiver may include a base and a metal extension slidably engageable with each other and lockable to each other at a desired position for adjusting the length of the metal receiver. The starter module adapter may further include a partition receivable in the receptacle for holding the starter module in place within the receptacle and one or more hold down structures.

The starter module may be any suitable device capable of providing electrical power to the vehicle or other equipment and may be of any size that can be received by the receptacle. For example, it may be in the form of (1) an electrical energy storage device comprising a single capacitor (i.e., condenser or condensator) or an assembly of capacitors configured in series, parallel or a combination of both; (2) an electric power generating device such as a battery module comprising a single battery cell or to an assembly of battery cells configured in series, parallel or a combination of both; or (3) a combination of (1) and (2).

The exterior dimensions, length, width and height of the housing assembly when assembled may be the same or nearly the same as the exterior dimensions of a standard battery.

Features and advantages of the disclosure are set forth in part in the description which follows and the accompanying drawings.

BRIEF DESCRIPTION OF THE DRAWINGS

FIG. 9 is a pattern of a fold together insulating jacket fitted over the housing assembly of the starter module adapter that allows only the positive and negative terminals to be exposed.

DETAILED DESCRIPTION

FIGS. 1-9 illustrate embodiments of a starter module adapter 6 and 106 including a housing assembly 10 and 110, respectively. Each housing assembly 10 and 110 may be used for installation of the starter module 16 and 116 in a vehicle or other equipment designed to employ a specific battery size even though the starter module to be installed is sized differently from the specific battery size intended for the vehicle or other equipment.

Figure 1B:
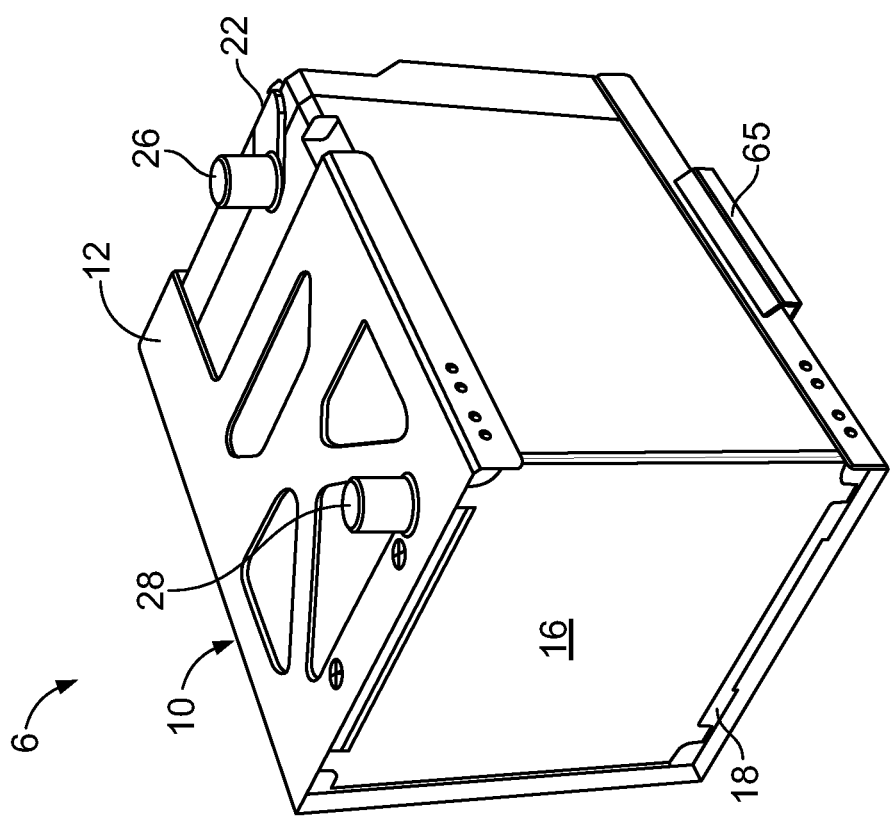
FIG. 1(b) is another perspective view of the starter module adapter of FIG. 1(a) illustrating the starter module contained in the housing assembly.
Figure 1A:
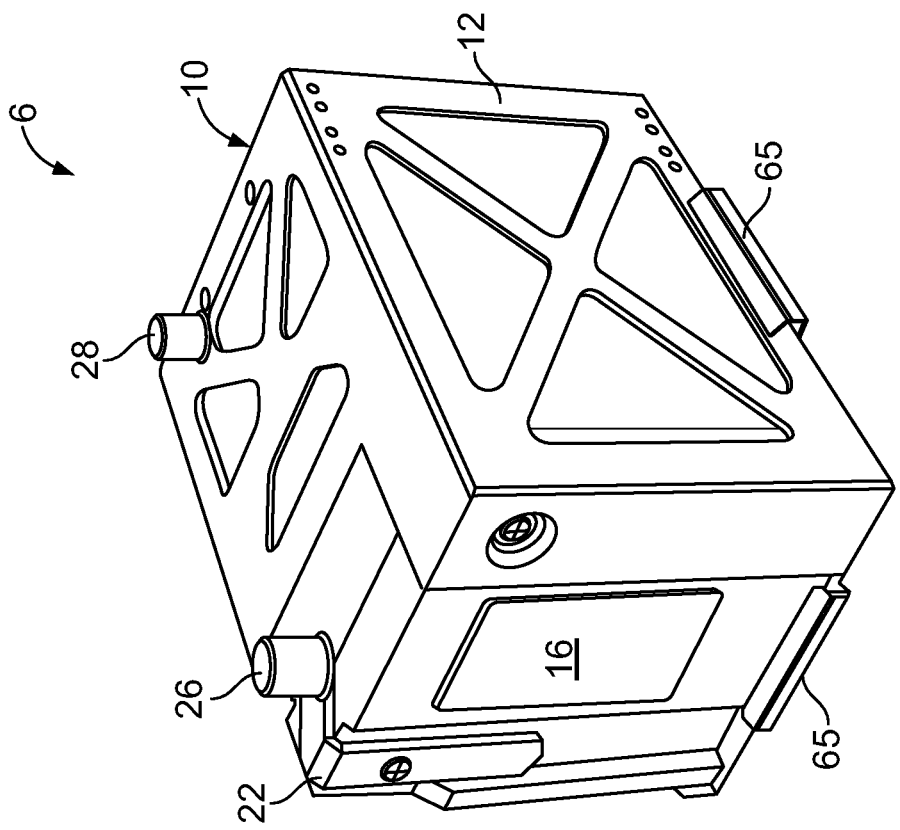
FIG. 1(a) is a perspective view of a starter module adapter in accordance with an embodiment of the present disclosure illustrating the starter module contained in the housing assembly.
Figure 2:
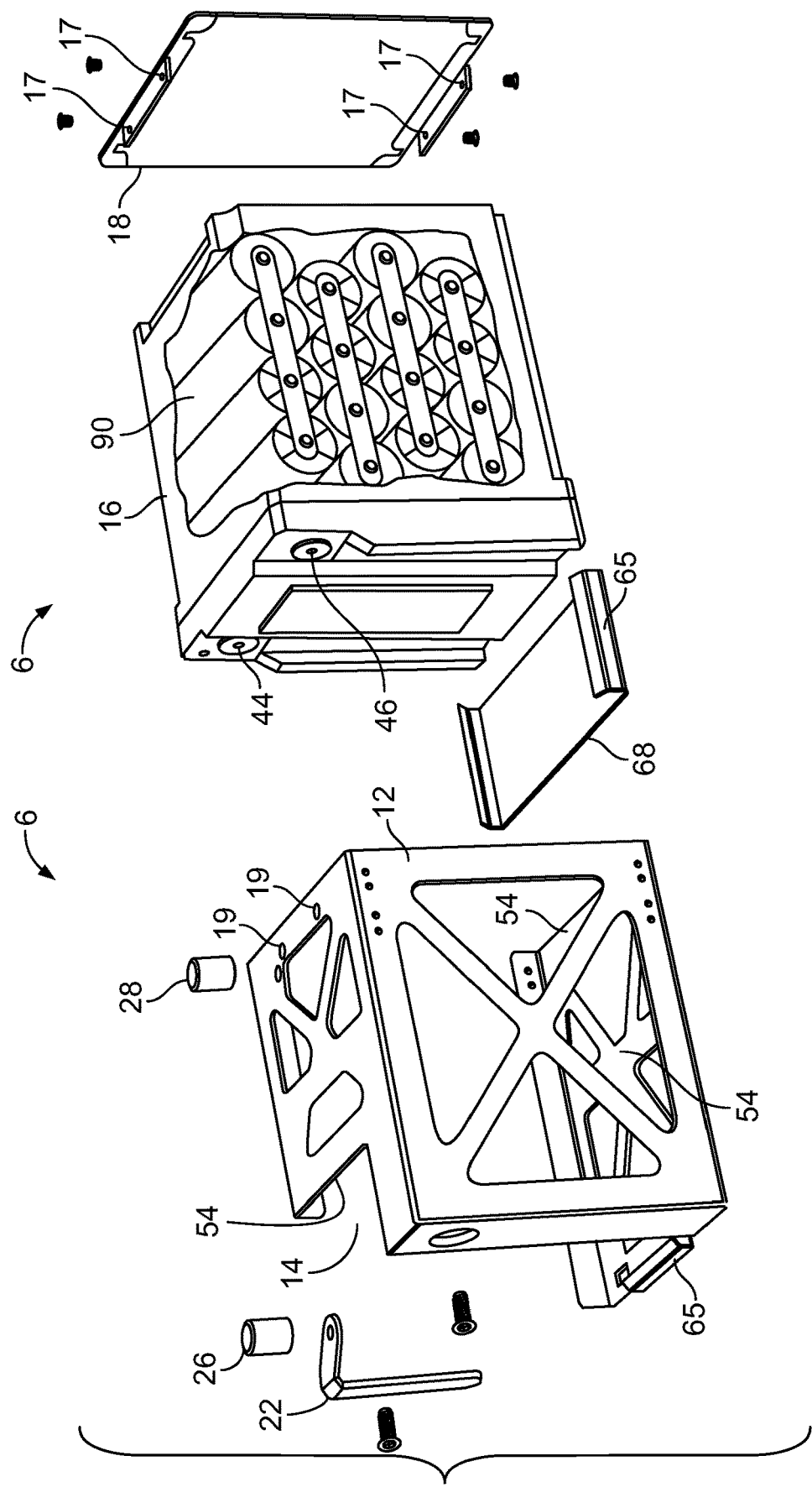
FIG. 2 is an exploded view of the starter module adapter of FIG. 1 also illustrating in cut out a starter module comprising cylindrical battery cells connected in series and in parallel.

With reference to FIGS. 1-3, the housing assembly 10 includes a metal receiver 12 that defines a receptacle 14 receiving the starter module 16, a partition 18, a first electrical connector in the form of a positive terminal busbar 22, a positive terminal 26 and a negative terminal 28. The starter module 16 may be of any suitable size configured to be received within the receptacle 14. The starter module 16 includes a positive terminal 44 and a negative terminal 46.

The positive terminal busbar 22 interconnects the positive terminal 44 of the starter module 16 with the positive terminal 26 of the housing assembly 10. The positive terminal busbar 22 is connected and secured to the positive terminal 44 of the starter module 16 by a screw or by any other suitable joining method. The positive terminal 26 is connected and secured to the positive terminal busbar 22 by a screw or by any other suitable joining method. The positive terminal busbar 22 instead may be any other suitable electrical connector such as a terminal cable, a bar or other suitable connector or combination of any of the foregoing and may have any other suitable configuration. The positive terminal 26 shown as a post may have any other suitable configuration.

The metal receiver 12 functions as an electrical connector that interconnects the negative terminal 46 of the starter module 16 with the negative terminal 28 of the housing assembly 10. The metal receiver 12 is connected and secured to the negative terminal 46 of the starter module 16 by a screw or by any other suitable joining method. The negative terminal 28 is connected and secured to the metal receiver 12 by a screw or by any other suitable joining method. The metal receiver 12 is constructed of metal with electric current carrying capacity and may have any other suitable configuration. The metal receiver 12 may also be constructed of any non-metal material that includes steel or other metal and that has electric current carrying capacity. The metal receiver 12 may have any other suitable configuration in accordance with other embodiments of the present disclosure. The negative terminal 28 shown as a post may have any other suitable configuration.

The partition 18 is received by the receptacle 14 and is positioned next to the starter module 16 to limit or eliminate movement of the starter module within the receptacle or for otherwise holding the starter module in place. The illustrated partition 18 is in the form of a metal frame with side rails, top and bottom rails and top and bottom brackets at right angle to the frame. The top and bottom brackets, each, incorporate two tapped holes 17. The partition 18 may have any other configuration that complements the sides of the starter module 16. The metal receiver 12 includes a pair of opposed walls 54 with two holes each 19 positioned to engage the partition 18 with securing screws. The location of the holes 19 depends upon the size of the starter module 16 received within the receptacle 14. The opposed walls 54 may incorporate multiple hole groups to provide alternative locations for the partition 18.

The metal receiver 12 incorporates one or more holddown structures 65. A pair of opposed hold down structures 65 may be interconnected by a removable bracket 68. The metal receiver 12 may be secured to the vehicle by employing the hold down structures or by any other suitable manner in accordance with other embodiments of the present disclosure. The partition 18 and the bracket 68 incorporating the side hold-down structures 65 may be constructed of metal, plastic or any other suitable material and may have any suitable configuration.

The distance between the positive terminal 26 and the negative terminal 28 of the housing assembly 10 depends upon the vehicle and the size of the battery the vehicle was designed to accommodate. For example, the distance between positive and negative battery terminals of a standard 8.2" long battery is about 6". For example, if the vehicle was intended for use with such a standard 8.2" long battery, the distance between the positive and negative terminals of the housing assembly would be about 6". The housing assembly 10 can be used with starter modules 16 having a distance between the positive and negative terminals 44 and 46 that is less than the distance between the positive terminal 26 and the negative terminal 28 of the housing assembly. By turning the starter module 180° in the receptacle, the polarity of terminals 26 and 28 in the housing assembly 10 may be reversed.

The starter module 16 may be any suitable device capable of providing electrical power to the vehicle and may be of any size that can be received by the receptacle 14. For example, it may be (1) an electrical energy storage device comprising a single capacitor (i.e., condenser or condensator) or an assembly of capacitors configured in series, parallel or a combination of both; (2) an electric power generating device such as a battery module comprising a single battery cell or to an assembly of battery cells configured in series, parallel or a combination of both; or (3) a combination of (1) and (2). The component(s) of the electrical device may or may not have a full or partial housing or enclosure.

Figure 3B:
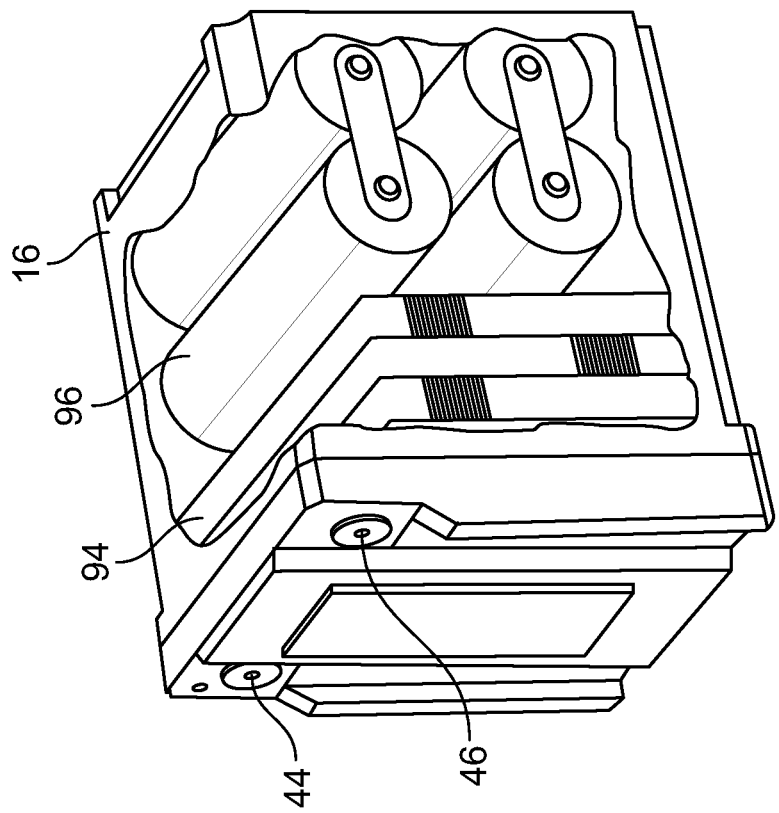
FIG. 3(b) is a perspective view of a starter module of FIG. 1 illustrating in cut out a starter module comprising a combination of power generating devices in the form of pouch type battery cells connected in series and electrical storage devices in the form of cylindrical capacitor cells connected in series.
Figure 3A:
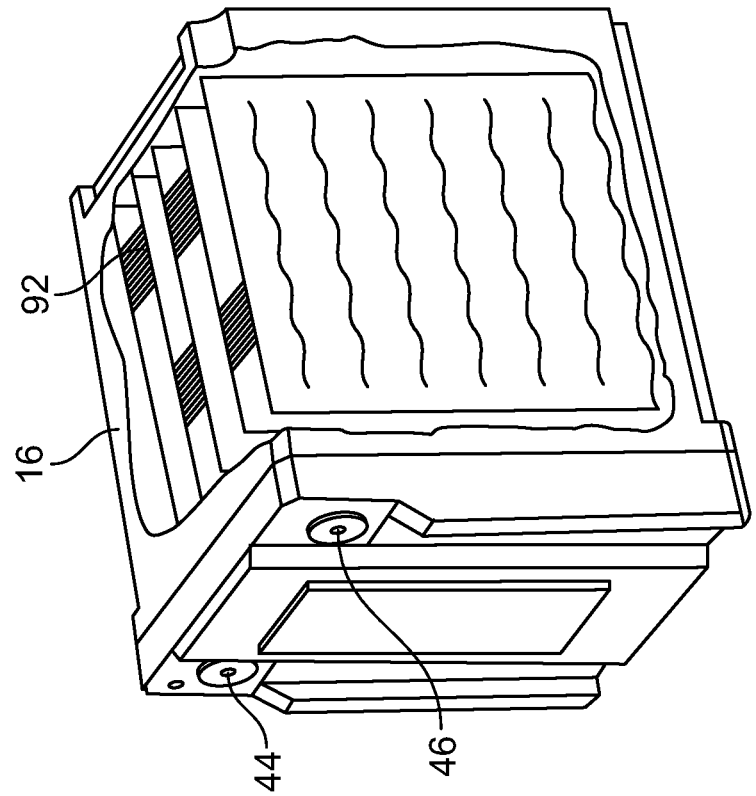
FIG. 3(a) is a perspective view of a starter module of FIG. 1 illustrating in cut out a starter module comprising laminated pouch type capacitor cells connected in series.
Figure 4:
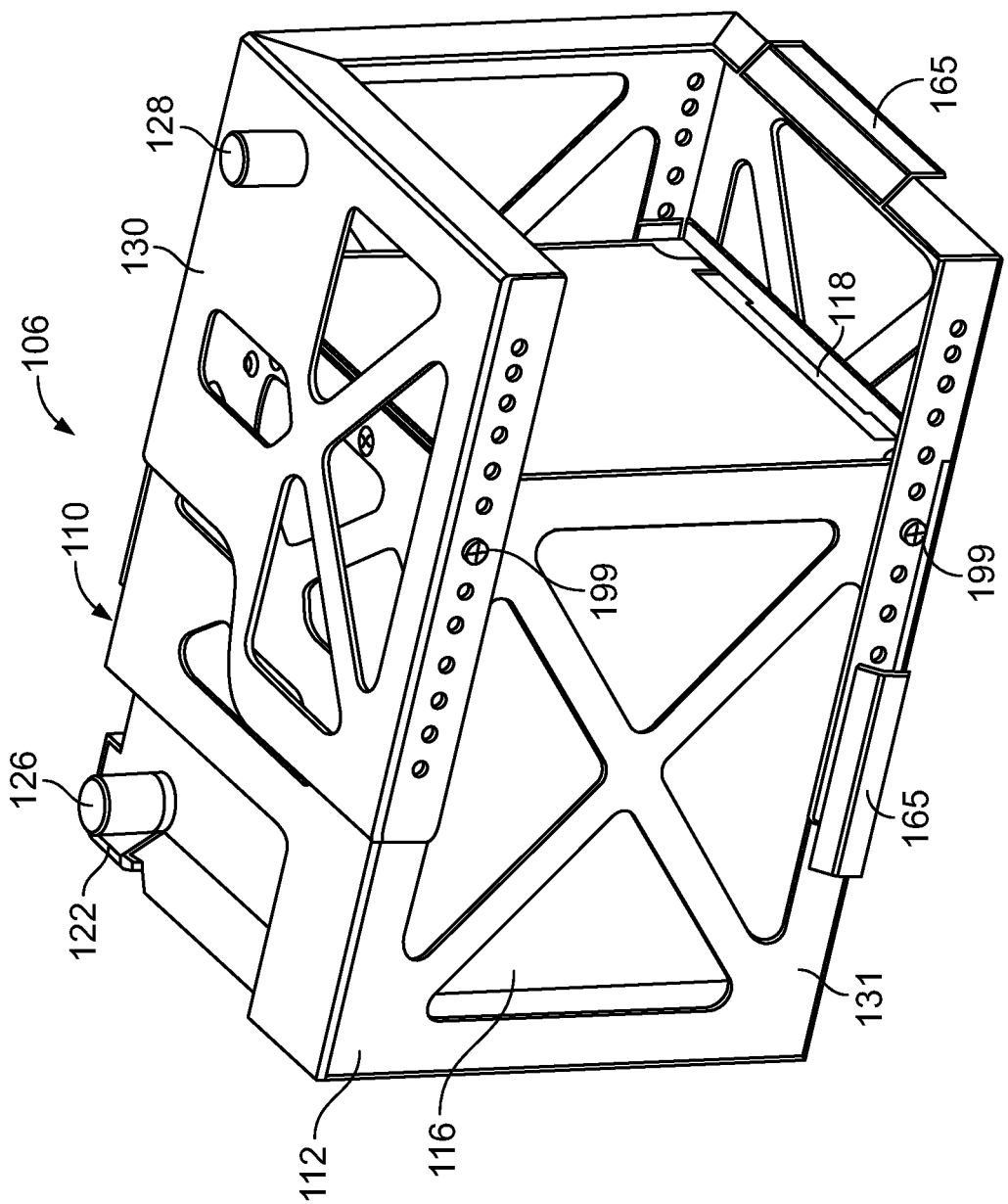
FIG. 4 is a perspective view of a starter module adapter in accordance with another embodiment of the present disclosure illustrating the starter module contained in the housing assembly.
Figure 5:
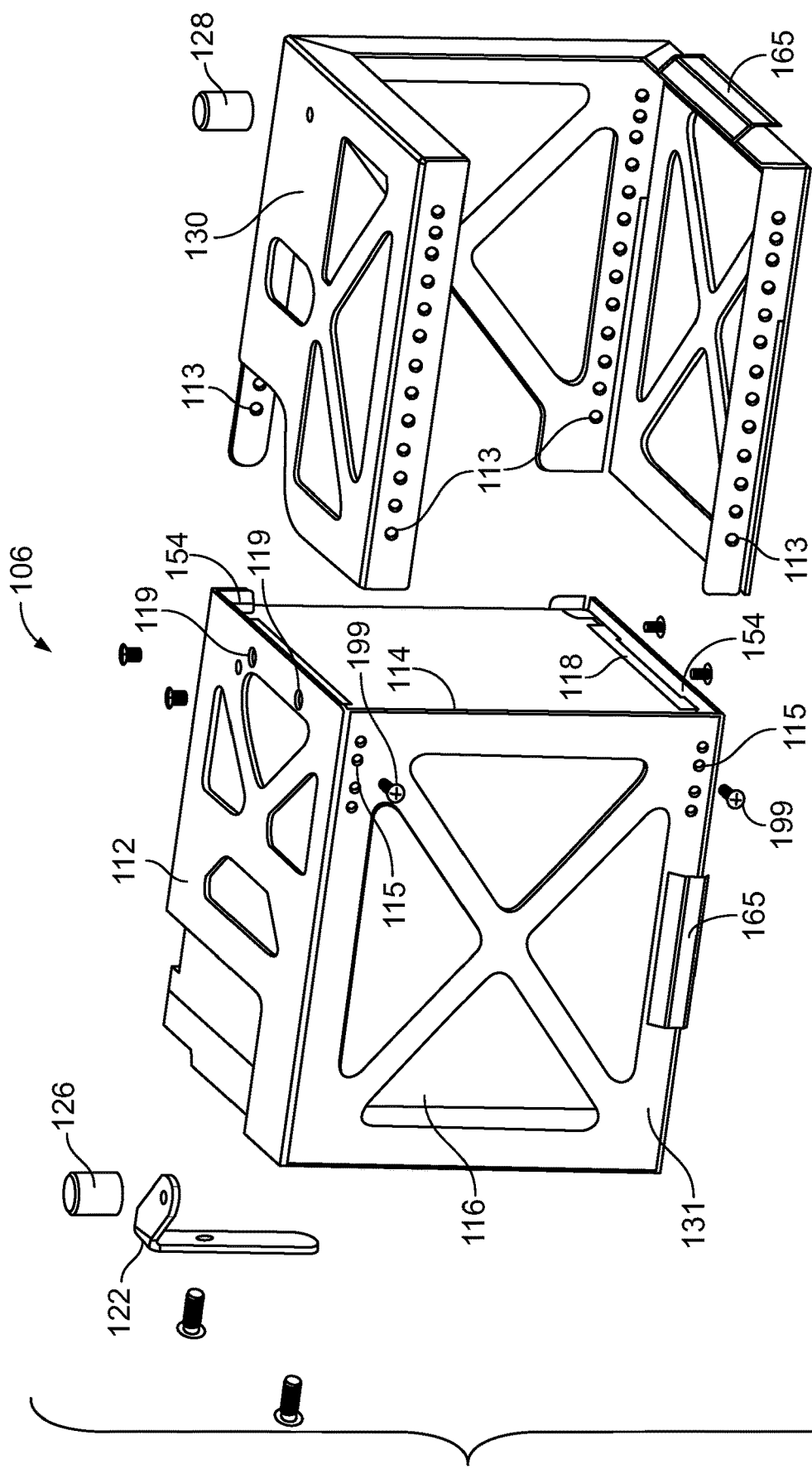
FIG. 5 is an exploded view of the starter module adapter of FIG. 4 also illustrating the starter module contained in the housing assembly.
Figure 6:
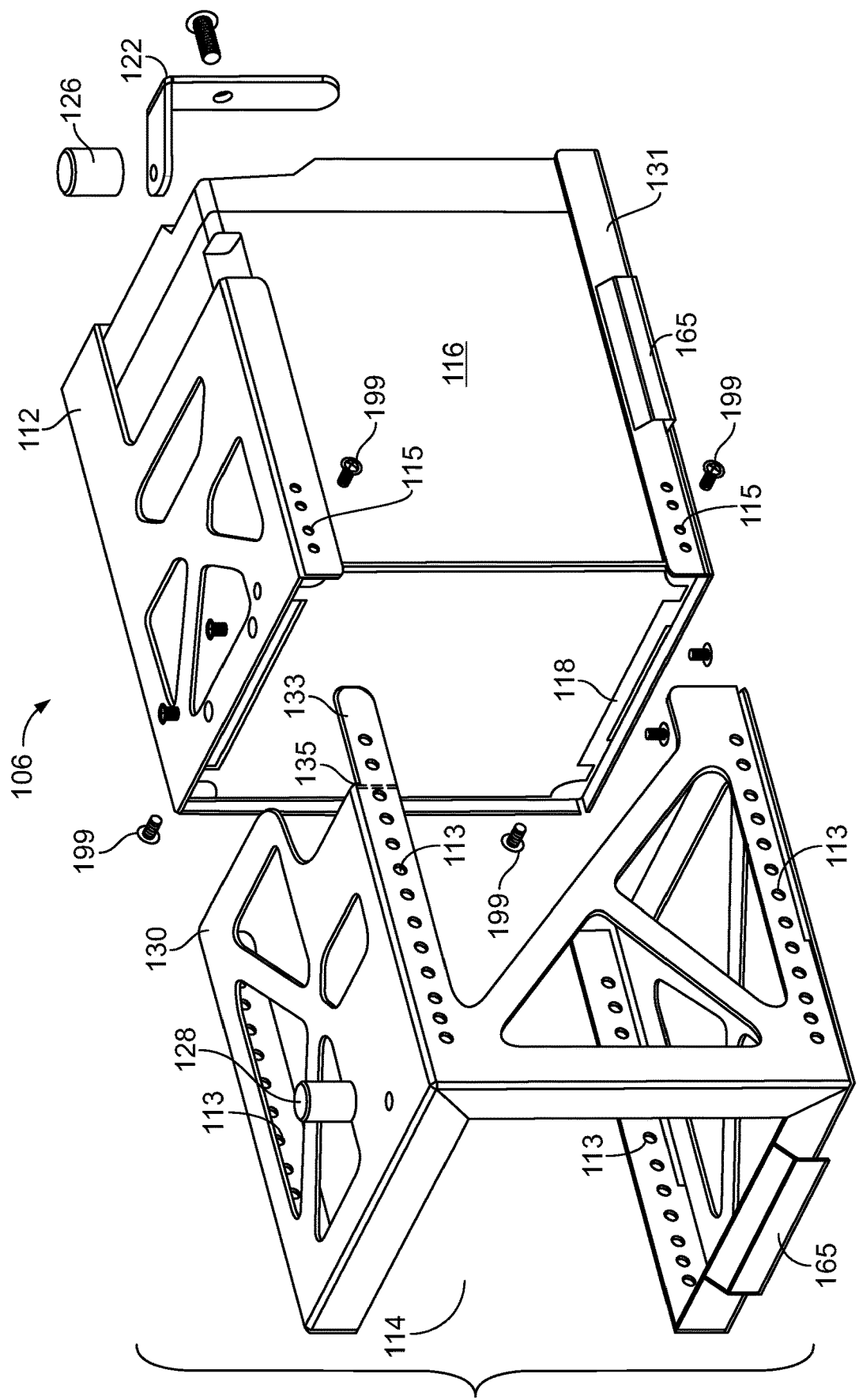
FIG. 6 is another exploded view of the starter module adapter of FIG. 4.
Figure 7:
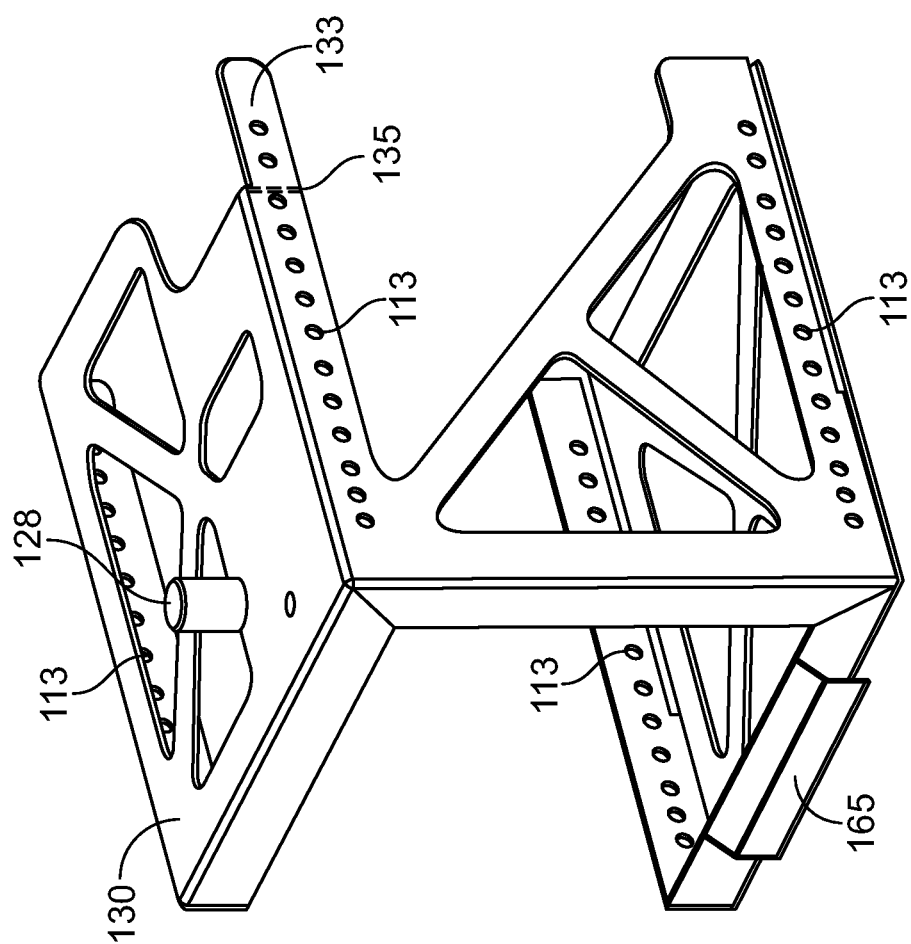
FIG. 7 is a perspective view of the extension and the negative terminal of the starter module adapter of FIG. 4.

FIG. 2 illustrates the starter module 16 in the form of an electric power generating device comprising cylindrical battery cells 90 connected in series and in parallel. FIG. 3(a) illustrates the starter module 16 in the form of an electrical energy storage device comprising laminated pouch type capacitor cells 92 connected in series. FIG. 3(b) illustrates the starter module 16 in the form of an electrical device comprising pouch type battery cells 94 connected in series and cylindrical capacitor cells 96 connected in series. The starter module 16 may instead be in the form of or include one or more battery modules of any suitable size configured to be received within the receptacle 14. Where there are two battery modules, the battery modules may be connected in parallel or in series and, where there are three or more battery modules, the battery modules may be connected in parallel or series or a combination of both.

In any instance where the starter module 16 has more than one positive terminal and/or more than one negative terminal, one of the electrical connectors interconnects at least one positive terminal of the starter module with the positive terminal 26 of the housing assembly 10 and/or the other electrical connector interconnects at least one negative terminal of the starter module 16 with the negative terminal 28 of the housing assembly.

With reference to FIGS. 4-7, a housing assembly 110 in accordance with another embodiment of the present disclosure includes a metal receiver 112 that defines a receptacle 114 receiving the starter module 116, partition 118, electrical connector in the form of a positive terminal busbar 122, a positive terminal 126 and a negative terminal 128. The metal receiver 112 interconnects the negative terminal 128 and the negative terminal of the starter module 116. The metal receiver 112 includes a first component in the form of a metal extension 130 and a base component 131 slidably engageable with the metal extension 130.

As in the case of the starter module 16, the starter module 116 may be any suitable device capable of providing electrical power to the vehicle and may be of any size that can be received by the receptacle 114. For example, it may be (1) an electrical energy storage device comprising a single capacitor (i.e., condenser or condensator) or an assembly of capacitors configured in series, parallel or a combination of both; (2) an electric power generating device such as a battery module comprising a single battery cell or an assembly of battery cells configured in series, parallel or a combination of both; or (3) a combination of (1) and (2). The component(s) of the electrical device may or may not have a full or partial housing or enclosure.

In any instance where the starter module 116 has more than one positive terminal and/or more than one negative terminal, one of the electrical connectors interconnects at least one positive terminal of the starter module with the positive terminal 126 of the housing assembly 110 and/or the other electrical connector interconnects at least one negative terminal of the starter module 116 with the negative terminal 128 of the housing assembly.

The positive terminal busbar 122 interconnects the positive terminal of the starter module with the positive terminal 126 of the housing assembly 110. The positive terminal busbar 122 is connected and secured to the positive terminal of the starter module 116 by a screw or by any other suitable joining method. The positive terminal 126 is connected and secured to the positive terminal busbar 122 by a screw or by any other suitable joining method. The positive terminal busbar 122 instead may be any other suitable electrical connector such as a cable, a bar or other suitable connector or combination of any of the foregoing and may have any other suitable configuration. The positive terminal 126 shown as a post may have any other suitable configuration.

The metal receiver 112, including the metal extension 130, functions as an electrical connector that interconnects the negative terminal of the starter module with the negative terminal 128. The metal extension 130 and the base component 131 are secured to each other by screws 199. The metal receiver 112 is connected and secured to the negative terminal of the starter module by a screw or by any other suitable joining method. The negative terminal 128 is connected and secured to the metal extension 130 by a screw or by any other suitable joining method. The metal receiver 112, including the extension 130, is constructed of metal with electric current carrying capacity and may have any other suitable configuration. The metal receiver, including the extension, may also be constructed of any non-metal material that includes steel or other metal and that has electric current carrying capacity. The metal receiver 112, including the metal extension 130, may have any other suitable configuration in accordance with other embodiments of the present disclosure. The negative terminal 128 shown as a post may have any other suitable configuration.

The partition 118 is received by the receptacle 114 and is positioned next to the starter module to limit or eliminate movement of the starter module within the receptacle or for otherwise holding the starter module in place. The illustrated partition 118 is in the form of a metal frame with side rails, top and bottom rails and top and bottom brackets at right angle to the frame. The top and bottom brackets, each, incorporate two tapped holes. The partition 118 may have any other configuration that complements the sides of the starter module. The metal receiver 112 includes a pair of opposed walls 154 with two holes each 119 positioned to engage the partition 118 with securing screws. The location of the holes 119 depends upon the size of the starter module received within the receptacle. The opposed walls 154 may incorporate multiple hole groups to provide alternative locations for the partition 118.

The metal extension 130 is slidingly engaged with the base component 131 and may be secured to each other in any suitable manner to achieve a desired length of the metal receiver 112. In the illustrated embodiment, for example, the base component 131 incorporates four tapped holes 115. The metal extension 130 incorporates hole groupings 113, for example, which allow the extension to be adjusted to a specific overall length. The metal extension 130 is secured to the base component 131 by screws 199. In the illustrated example, there are multiple hole groupings that allow for overall lengths from 8.2" to 13.9". Tab 133 is designed to be broken off along the weakened line 135 when the extension 130 is configured in 11" or less overall length. In these positions the negatively charged tab 133 is deemed to be too close to the positively charged battery terminal 126. The metal extension 130 and the base component 131 may be secured together at the desired position in any other manner in accordance with other embodiments of the present disclosure.

The metal receiver 112 may incorporate one or more hold down structures 165. The metal receiver 112, including the extension 130, may be secured to the vehicle by employing the hold down structures or in any other suitable manner. The partition 118 and hold-down structures 165 may be constructed of metal, plastic or any other suitable material and may have any suitable configuration.

The distance between the positive terminal 126 and negative terminal 128 of the housing assembly 110 depends upon the vehicle and the size of the battery the vehicle was designed to accommodate. For example, the distance between positive and negative terminals of a standard 13.9" long battery is about 11.5". For example, if the vehicle was intended for use with such a standard 13.9" long battery, the distance between the positive and negative terminals 126 and 128 of the housing assembly 110 would be about 11.5". Since the metal extension 130 incorporating multiple hole groupings is slidingly engaged with the metal base component 131, standard overall battery lengths of 8.2" to 13.9", for example, may be configured resulting in standard terminal distances of approximately 6" to 11.5". The housing assembly 110 can be used with a starter module having a distance between the positive and negative terminals that is less than the distance between the positive terminal 126 and the negative terminal 128 of the housing assembly. By turning the starter module 180° in the receptacle, the polarity of terminals 126 and 128 in the housing assembly 110 may be reversed.

Figure 8:
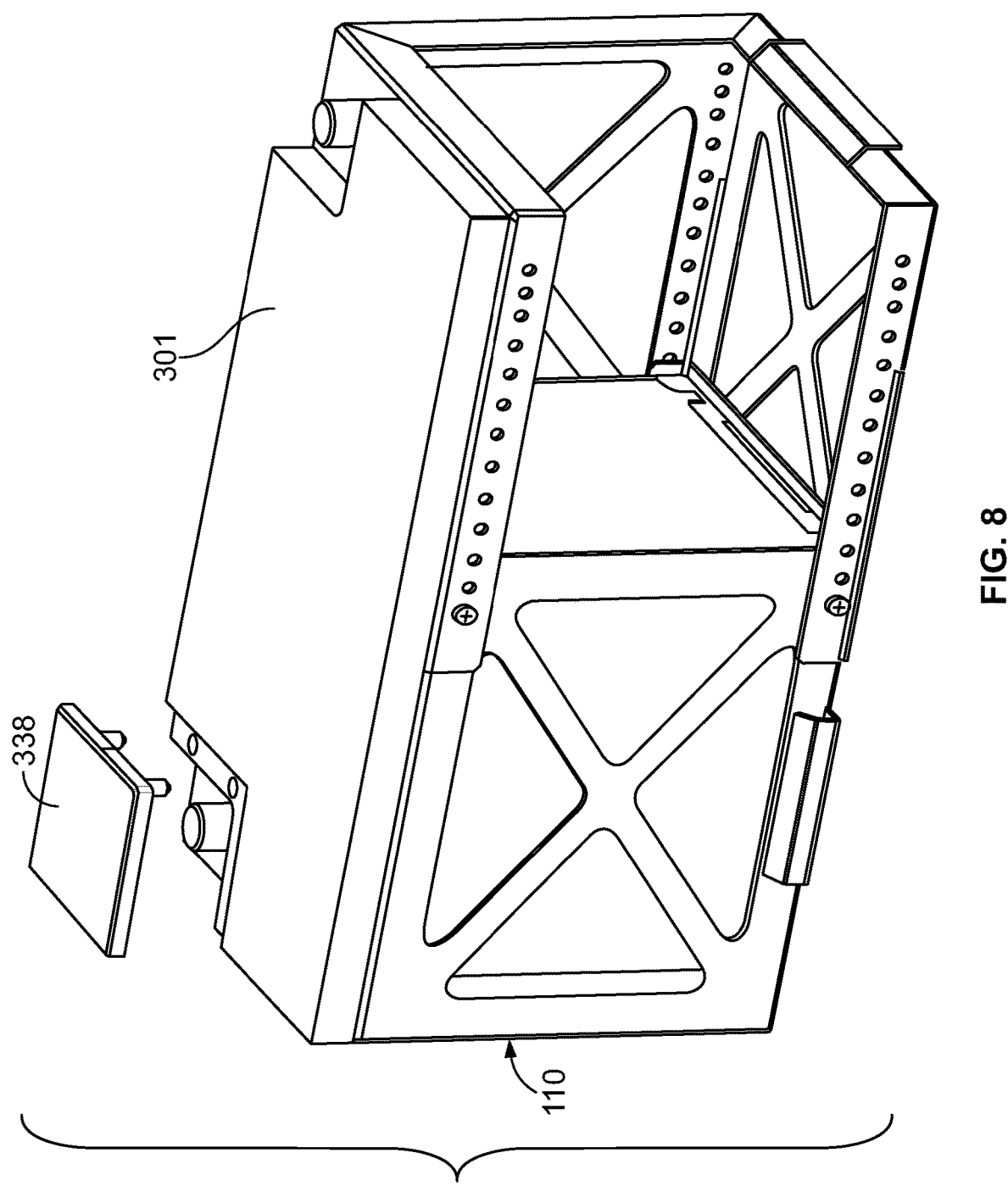
FIG. 8 is a perspective view of a starter module adapter illustrating a rigid pad attached to the top of the housing assembly.

With reference to FIG. 8, a rigid pad 301 may be attached to the top of the housing assembly 10 and 110. The pad 301 may also include a terminal lid 338 to cover the positive terminal. The combined height of the housing assembly and the thickness of the rigid pad 301 serves as a load bearing structure in some vehicle applications. The rigid pad 301 and the terminal lid 338 may be of any suitable material. The rigid pad 301 may be attached to the housing assembly by any suitable means.

With reference to FIG. 9, the starter module adapter may also include a fold together insulating jacket 401 made out of thin non-conductive material for fully isolating the starter module adapter from the surroundings while exposing the positive and negative terminals of the housing assembly. The fold together insulating jacket 401 is comprised of thin non-conductive material. The fold together insulating jacket 401 is foldable to substantially enclose the housing assembly, and includes a pair of apertures 402 for receiving and exposing the positive and negative terminals of the housing assembly to facilitate access thereto. The insulating jacket 401 may have any other suitable configuration. The insulation of the starter module adapter may be achieved by any other suitable means.

The present disclosure provides many benefits. For example, vehicles are typically designed to accommodate specific size batteries (e.g., from 8.2" to 13.9" long) and therefore the size of batteries to be installed on such vehicles is typically limited to the specific size. The starter module adapter 6 or 106 comprising housing assembly 10 or 110 of the present disclosure, however, enables smaller starter modules to be used on such vehicles. The present disclosure, among other things, provides an efficient manner for using odd size devices such as batteries or other starter modules on vehicles designed to use a specific standard battery size. Reference to standard battery size herein are intended to refer to the size and dimensions of a commercially used battery as understood by one of ordinary skill in the art. For example, such references are intended to include battery sizes standardized by agreement by two or more battery manufacturers or battery sizes of any other vehicle batteries having predetermined sizes and dimensions. Similarly, one of ordinary skill in the art understands that references to "starter module" herein are intended to refer to any suitable electrical device that may be but not limited to: (1) an electrical energy storage device comprising a single capacitor (i.e., condenser or condensator) or an assembly of capacitors configured in series, parallel or a combination of both; (2) an electric power generating device such as a battery module comprising a single battery cell or to an assembly of battery cells configured in series, parallel or a combination of both; or (3) a combination of (1) and (2).

The present disclosure also provides ease of manufacture benefits because, among other reasons, the components are versatile, few in number and constructed in whole or in part of sheet metal. The receiver constructed of sheet metal merely requires forming without the need for special tooling.

While embodiments have been illustrated and described in the drawings and foregoing description, such illustrations and descriptions are considered to be exemplary and not restrictive in character. It is understood that only illustrative embodiments have been shown and described and that all changes and modifications that come within the spirit of the present disclosure are protected. The drawings and description are not intended to be construed as having or implying limitation of the disclosure to those embodiments. There is a plurality of advantages of the present disclosure arising from various features set forth in the description. It will be noted that alternative embodiments of the disclosure may not include all of the features described yet still benefit from at least some of the advantages of the present disclosure. Those of ordinary skill in the art may readily devise their own implementations of the disclosure and associated methods, without undue experimentation, that incorporate one or more of the features of the disclosure and fall within the spirit and scope of the present disclosure and the appended claims.

The invention claimed is:

1. A starter module adapter for a battery of a vehicle comprising a starter module having a first positive terminal and a first negative terminal and a distance therebetween, the starter module adapter comprising:
   a housing assembly including:
   a second positive terminal and a second negative terminal having a distance therebetween, the distance between the second positive terminal and the second negative terminal is greater than the distance between the first positive terminal and the first negative terminal;
   a first electrical connector interconnecting the first positive terminal and the second positive terminal; and
   a second electrical connector interconnecting the first negative terminal and the second negative terminal; and
   wherein one of the first electrical connector and the second electrical connector comprises a metal receiver defining a receptacle for receiving the starter module, the metal receiver comprising a pair of opposed walls and a third wall extending perpendicular to and interconnecting the pair of opposed walls, at least one of the opposed walls and the third wall extending at least 8.2".

2. The starter module adapter of claim 1 wherein the metal receiver interconnects the first negative terminal and the second negative terminal.

3. The starter module adapter of claim 1 wherein the metal receiver interconnects the first positive terminal and the second positive terminal.

4. The starter module adapter of claim 1 wherein one of the first electrical connector and the second electrical connector comprises a busbar.

5. The starter module adapter of claim 1 wherein one of the first electrical connector and the second electrical connector comprises a terminal cable.

6. The starter module assembly of claim 1 wherein the starter module comprises at least one capacitor.

7. The starter module assembly of claim 1 wherein the starter module comprises a plurality of capacitors arranged in series.

8. The starter module assembly of claim 1 wherein the starter module comprises a plurality of capacitors arranged in parallel.

9. The starter module assembly of claim 1 wherein the starter module comprises a plurality of capacitors, some of the capacitors arranged in series and some of the capacitors arranged in parallel.

10. The starter module assembly of claim 1 wherein the starter module comprises at least one battery module.

11. The starter module assembly of claim 10 wherein the starter module further comprises at least one capacitor.

12. The starter module of claim 1 wherein the starter module comprises a plurality of battery modules connected in parallel.

13. The starter module assembly of claim 1 wherein the starter module comprises a plurality of battery modules connected in series.

14. The starter module assembly of claim 1 wherein the starter module comprises at least three battery modules, a first of the at least three battery modules and a second of the at least three battery modules connected in series and a third of the at least three battery modules connected to the second of the at least three battery modules in parallel.

15. The starter module adapter of claim 1 further comprising a partition receivable in the receptacle for holding the starter module in place within the receptacle.

16. The starter module adapter of claim 1 further comprising at least one hold-down structure.

17. The starter module adapter of claim 1 wherein the distance between the second positive terminal and the second negative terminal is substantially the same as the distance between a positive battery terminal and a negative battery terminal of a standard battery.

18. The starter module adapter of claim 1 wherein the distance between the second positive terminal and the second negative terminal is approximately 6".

19. The starter module adapter of claim 1 wherein the distance between the second positive terminal and the second negative terminal is approximately 7".

20. The starter module adapter of claim 1 wherein the distance between the second positive terminal and the second negative terminal is approximately 8.5".

21. The starter module adapter of claim 1 wherein the distance between the second positive terminal and the second negative terminal is approximately 11.5".

22. The starter module adapter of claim 1 further comprising an insulating jacket substantially enclosing the housing assembly, the insulating jacket defining a pair of apertures for receiving the second positive terminal and the second negative terminal to allow access to the second positive terminal and the second negative terminal.

23. The starter module adapter of claim 22 wherein the insulating jacket is foldable to substantially enclose the housing assembly.

24. A starter module adapter for a battery of a vehicle comprising a starter module having a first positive terminal and a first negative terminal and a distance therebetween, the starter module adapter comprising:
 a housing assembly including:
 a second positive terminal and a second negative terminal having a distance therebetween, the distance between the second positive terminal and the second negative terminal is greater than the distance between the first positive terminal and the first negative terminal;
 a first electrical connector interconnecting the first positive terminal and the second positive terminal; and
 a second electrical connector interconnecting the first negative terminal and the second negative terminal;
 wherein one of the first electrical connector and the second electrical connector comprises a metal receiver defining a receptacle for receiving the starter module; and
 wherein the metal receiver includes a metal extension for adjusting the length of the metal receiver.

25. A starter module adapter for a battery of a vehicle comprising a starter module having a first positive terminal and a first negative terminal and a distance therebetween, the starter module adapter comprising:
 a housing assembly including:
 a second positive terminal and a second negative terminal having a distance therebetween, the distance between the second positive terminal and the second negative terminal is greater than the distance between the first positive terminal and the first negative terminal;
 a first electrical connector interconnecting the first positive terminal and the second positive terminal; and
 a second electrical connector interconnecting the first negative terminal and the second negative terminal;
 wherein one of the first electrical connector and the second electrical connector comprises a metal receiver defining a receptacle for receiving the starter module; and
 wherein the metal receiver includes a base component and a metal extension for adjusting the length of the metal receiver.

26. The starter module adapter of claim 25 wherein the base component and metal extension are slidably engageable with each other to adjust the length of the metal receiver.

27. The starter module adapter of claim 26 further comprising fasteners for locking the two components together to achieve a desired length of the metal receiver.

28. The starter module adapter of claim 25 wherein the extension comprises multiple hole groupings to achieve a desired length of the metal receiver.

29. A starter module adapter for a battery of a vehicle having a starter module having a first positive terminal and a first negative terminal and a distance therebetween, the starter module adapter comprising:
 a housing assembly comprising:
 a second positive terminal and a second negative terminal having a distance therebetween, the distance between the second positive terminal and the second negative terminal is greater than the distance between the first positive terminal and the first negative terminal;
 an electrical connector comprising a metal receiver defining a receptacle for receiving the starter module, the metal receiver including a pair of opposed walls and a third wall extending perpendicular to and interconnecting the pair of opposed walls, at least one of the opposed walls and the third wall extending at least 8.2", the metal receiver interconnecting the first negative terminal and the second negative terminal; and
 an electrical connector interconnecting the first positive terminal and the second positive terminal.

30. The starter module assembly of claim 29 wherein the starter module comprises at least one capacitor.

31. The starter module assembly of claim 29 wherein the starter module comprises a plurality of capacitors arranged in series.

32. The starter module assembly of claim 29 wherein the starter module comprises a plurality of capacitors arranged in parallel.

33. The starter module assembly of claim 29 wherein the starter module comprises a plurality of capacitors, some of the capacitors arranged in series and some of the capacitors arranged in parallel.

34. The starter module adapter of claim 29 wherein the distance between the second positive terminal and the second negative terminal is substantially the same as the distance between a positive terminal and a negative terminal of a standard battery.

35. The starter module adapter of claim 29 further comprising an insulating jacket substantially enclosing the housing assembly, the insulating jacket defining a pair of apertures for receiving the second positive terminal and the second negative terminal to allow access to the second positive terminal and the second negative terminal.

36. The starter module adapter of claim 35 wherein the insulating jacket is foldable to substantially enclose the housing assembly.

37. A starter module adapter for a battery of a vehicle having a starter module having a first positive terminal and a first negative terminal and a distance therebetween, the starter module adapter comprising:
 a housing assembly comprising:
 a second positive terminal and a second negative terminal having a distance therebetween, the distance between the second positive terminal and the second negative terminal is greater than the distance between the first positive terminal and the first negative terminal;
 an electrical connector comprising a metal receiver defining a receptacle for receiving the starter module, the metal receiver interconnecting the first negative terminal and the second negative terminal; and
 an electrical connector interconnecting the first positive terminal and the second positive terminal;
 wherein the metal receiver includes a metal extension for adjusting the length of the metal receiver.

38. A starter module adapter for a battery of a vehicle having a starter module having a first positive terminal and a first negative terminal and a distance therebetween, the starter module adapter comprising:
 a housing assembly comprising:
 a second positive terminal and a second negative terminal having a distance therebetween, the distance between the second positive terminal and the second negative terminal is greater than the distance between the first positive terminal and the first negative terminal;
 an electrical connector comprising a metal receiver defining a receptacle for receiving the starter module, the metal receiver interconnecting the first negative terminal and the second negative terminal; and an electrical connector interconnecting the first positive terminal and the second positive terminal;

wherein the metal receiver includes a base component and a metal extension for adjusting the length of the metal receiver.

39. The starter module adapter of claim 38 wherein the base component and metal extension are slidably engageable with each other to adjust the length of the metal receiver.

40. A starter module adapter for a battery of a vehicle comprising a starter module having a first positive terminal and a first negative terminal and a distance therebetween, the starter module adapter comprising:

a housing assembly including:

a second positive terminal and a second negative terminal having a distance therebetween, the distance between the second positive terminal and the second negative terminal is greater than the distance between the first positive terminal and the first negative terminal;

a first electrical connector interconnecting the first positive terminal and the second positive terminal; and a second electrical connector interconnecting the first negative terminal and the second negative terminal;

wherein one of the first electrical connector and the second electrical connector comprises a metal receiver defining a receptacle for receiving the starter module, the metal receiver comprising a pair of opposed walls and a third wall extending perpendicular to and interconnecting the pair of opposed walls, at least one of the opposed walls and the third wall extending at least 8.2";

wherein the starter module comprises at least one battery module and at least one capacitor and is receivable within the receptacle of the metal receiver.

* * * * *